US009390041B2

(12) United States Patent
Nie et al.

(10) Patent No.: US 9,390,041 B2
(45) Date of Patent: Jul. 12, 2016

(54) METHOD FOR PROCESSING DEVICE CONNECTION, COMBINATION DEVICE AND HOST DEVICE

(75) Inventors: Zhenhui Nie, Shenzhen (CN); Yeqi Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 440 days.

(21) Appl. No.: 13/349,099

(22) Filed: Jan. 12, 2012

(65) Prior Publication Data

US 2012/0179792 A1 Jul. 12, 2012

(30) Foreign Application Priority Data

Jan. 12, 2011 (CN) .......................... 2011 1 0005701

(51) Int. Cl.
- G06F 15/177 (2006.01)
- G06F 13/38 (2006.01)
- H04L 29/06 (2006.01)
- H04L 12/24 (2006.01)
- G06F 12/00 (2006.01)

(52) U.S. Cl.
CPC .............. G06F 13/385 (2013.01); H04L 29/06 (2013.01); H04L 41/0809 (2013.01); H04L 41/0816 (2013.01)

(58) Field of Classification Search
CPC ............ G06F 6/12; G06F 6/03; G06F 13/38; G06F 13/382; G06F 13/385; G06F 3/00; H04L 41/0806; H04L 41/0809; H04L 41/0816
USPC .................. 709/203, 217–221, 223–229, 250
See application file for complete search history.

(56) References Cited

U.S. PATENT DOCUMENTS 6,249,825 B1 * 6/2001 Sartore et al. ...................... 710/8
7,509,487 B2 * 3/2009 Lu et al. ........................ 713/151
(Continued)

FOREIGN PATENT DOCUMENTS

| CN | 1215188 A | 4/1999 |
| CN | 101105778 A | 1/2008 |
| CN | 101266590 A | 9/2008 |
| WO | WO 2004046942 A1 | 6/2004 |

OTHER PUBLICATIONS

M-NPL-[MS-RNDIS]-v20130118 Remote Network Driver Interface Specification (RNDIS) Protocol Copyright © 2013 Microsoft Corporation. Release: Friday, Jan. 18, 2013.*

(Continued)

Primary Examiner — Zarni Maung
(74) Attorney, Agent, or Firm — Leydig, Voit & Mayer, Ltd.

(57) ABSTRACT

The embodiments of the present invention provide a method for processing device connection, a combination device and a host device. A method for processing device connection, includes: after being plugged into a host device, receiving a device descriptor modification instruction sent by the host device, modifying a device descriptor according to the device descriptor modification instruction and performing device reconnection processing, sending the modified device descriptor to the host device so that the host device establishes a new network connection according to the modified device descriptor. In the embodiments of the present invention, a user does not need to restart the host device to access the network using a RNDIS device in the combination device, which makes it convenient for the user to operate.

16 Claims, 5 Drawing Sheets

(56) References Cited

U.S. PATENT DOCUMENTS

| | | | |
|---|---|---|---|
| 8,171,502 B2* | 5/2012 | Mullis et al. | 719/321 |
| 8,605,307 B2* | 12/2013 | Takano | 358/1.15 |
| 8,738,816 B2* | 5/2014 | Desai | 710/9 |
| 2004/0203296 A1* | 10/2004 | Moreton et al. | 439/894 |
| 2005/0080936 A1* | 4/2005 | Ray et al. | 710/1 |
| 2005/0240695 A1 | 10/2005 | Leaming | |
| 2007/0299650 A1 | 12/2007 | Tamayo et al. | |
| 2009/0054069 A1* | 2/2009 | Calnan et al. | 455/445 |
| 2010/0174833 A1* | 7/2010 | Filer et al. | 710/8 |
| 2012/0173484 A1* | 7/2012 | Perrin et al. | 707/621 |

OTHER PUBLICATIONS

Firmware loading using standardized protocols; Lund University, Linus Walleij, Nov. 15, 2004.*

1st Office Action in corresponding European Patent Application No. 12 150 925.1 (Apr. 9, 2013).

1st Office Action in corresponding Chinese Patent Application No. 201110005701.0 (Aug. 14, 2012).

Extended European Search Report in corresponding European Patent Application No. 12150925.1 (Apr. 5, 2012).

* cited by examiner

METHOD FOR PROCESSING DEVICE CONNECTION, COMBINATION DEVICE AND HOST DEVICE

CROSS-REFERENCE TO RELATED APPLICATION

This application claims priority to Chinese Patent Application No. 201110005701.0, filed on Jan. 12, 2011, which is hereby incorporated by reference in its entirety.

FIELD OF THE INVENTION

The present invention relates to the communication field, and in particular, to a method for processing device connection, a combination device and a host device.

BACKGROUND OF THE INVENTION

The Remote Network Driver Interface Specification (RNDIS) is a network device specification proposed by Microsoft Corporation, which makes it unnecessary for a host device (such as a personal computer, a laptop, etc) to individually install drivers for respective specific devices. A Windows system is provided with a driver for an RNDIS device, where the driver can load a drive for the RNDIS device in a compatible mode. Therefore, the RNDIS device can use a network function without the need of installing the driver in the Windows system.

In the use of a RNDIS device, a user usually desires to preserve data downloaded from the network. Thus, a Secure Digital (SD) card function can be added to a current RNDIS device, so that a combination of the RNDIS device and a SD card constitutes a combination device. Therefore, the user may directly save the data downloaded through the RNDIS device into the SD card to enhance portability.

In implementing the embodiments of the present invention, the inventors realize the following drawbacks of prior art: at present, in a Windows system, if a combination device is unplugged from a host device while the SD card is being accessed, then when the combination device is plugged into the host device again, the combination device is unable to access the network through the RNDIS device. In this situation, usually a user may need to restart the host device to access the network through the RNDIS device, which causes inconvenience to the user.

SUMMARY OF THE INVENTION

In view of the foregoing, embodiments of the present invention provide a method for processing device connection, a combination device, and a host device.

An embodiment of the present invention provides a method for processing device connection, including:

after being plugged into a host device, receiving a device descriptor modification instruction sent by the host device;

according to the device descriptor modification instruction, modifying the device descriptor and performing reconnection processing for the device; and sending the modified device descriptor to the host device so that the host device establishes a new network connection according to the modified device descriptor.

An embodiment of the present invention provides another method for processing device connection, including:

after a combination device is plugged, if a network connection is not released after the last removal of the combination device, sending a device descriptor modification instruction to the combination device;

receiving a device descriptor which is modified and sent by the combination device according to the device descriptor modification instruction; and establishing a new network connection for the combination device according to the modified device descriptor.

An embodiment of the present invention provides a combination device, including:

a first receiving module, configured to receive a device descriptor modification instruction sent by a host device after the combination device is plugged into the host device;

a first modification module, configured to modify the device descriptor and perform device reconnection processing according to the device descriptor modification instruction; and a first sending module, configured to send the modified device descriptor to the host device, so that the host device establishes a new network connection according to the modified device descriptor.

An embodiment of the present invention provides a host device, including:

a second sending module, configured to send a device descriptor modification instruction to a combination device if a network connection after the last removal of the combination device is not released, after the combination device is plugged into the host device;

a second receiving module, configured to receive a device descriptor which is modified and sent by the combination device according to the device descriptor modification instruction; and a connection establishment module, configured to establish a new network connection for the combination device according to the modified device descriptor.

In the embodiments of the present invention, when determining that a network connection is not released after the last removal of a combination device, a host device may send a device descriptor modification instruction to a combination device and instruct the combination device to report the modified device descriptor when the combination device is plugged in this time. Therefore, the host device considers the combination device as a new combination device according to the modified device descriptor and establishes a new network connection for the combination device, which in turn enables a user to access the network through the RNDIS device in the combination device. In the embodiments of the present invention, it is unnecessary for a user to restart the host device, which makes it convenient for the user to operate.

BRIEF DESCRIPTION OF THE DRAWINGS

In the following, drawings to be used for explaining embodiments of the present invention or the prior arts will be briefly described, for the purpose of explaining the technical solutions of the embodiments of the present invention or of the prior art more clearly. Obviously, the drawings as described in the following merely illustrate some embodiments of the present invention. For those skilled in the art, other drawings are obtainable according to these drawings, without inventive labor.

DETAILED DESCRIPTION OF THE EMBODIMENTS

To further clarify the purpose, characteristics and benefits of the present invention, in the following, reference will be made to the drawings of the embodiments of the present invention to clearly and fully describe the technical solutions of the embodiments of the present invention. Apparently, the embodiments described herein are merely a part, rather than all, of the embodiments of the present invention. All other embodiments made without inventive labor by a person of ordinary skill in the art, based on the embodiments of the present invention, fall within the protection scope of the present invention.

Figure 1:
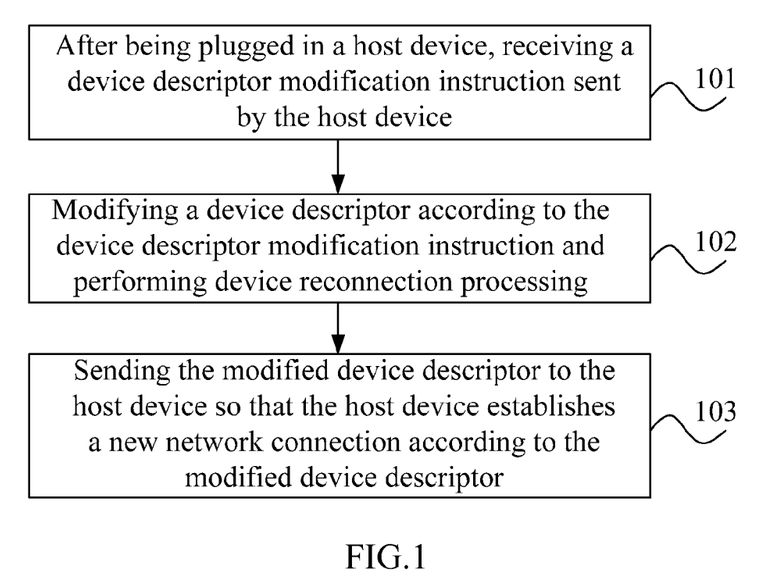
FIG. 1 is a flow chart of a first embodiment of a method for processing device connection according to the present invention.

FIG. 1 is a flow chart of a first embodiment of a method for processing device connection according to the present invention. As shown in FIG. 1, the method of this embodiment may include:

Step 101: After being plugged into a host device, receive a device descriptor modification instruction sent by the host device.

Specifically, a monitoring program may be installed in the host device of this embodiment. The monitoring program can be installed through an optical disk of the combination device, or it can be installed through a virtual optical disk mapped by the combination device or through a Universal Serial Bus (USB) flash disk. The monitoring program in this embodiment has a simple function. That is, it is merely responsible for monitoring the scenario where the combination device has already been removed from the host device while the network connection is not released.

In the prior art, when the combination device is removed from the host device, if the SD card of the combination device is being accessed, the host device can detect that the SD card resource has not been released, which makes the network connection corresponding to the RNDIS device unreleased. However, when the combination device is plugged in again, since the host device detects that the network connection corresponding to the RNDIS device is not released, the host device will not establish a new network connection for the RNDIS device. However, the presently plugged combination device does not match with the network connection established when the combination device was plugged into the host device last time. Therefore, the combination device can not access the network by using the RNDIS device.

In this embodiment, after being plugged into the host device, the combination device may send its default device descriptor to the host device, and the monitoring program of the host device may know whether the network connection is released after the combination device is removed from the host device last time. If the network connection is not released, the host device may send a device descriptor modification instruction to the combination device. The device descriptor modification instruction may be used for instructing the combination device to modify the default device descriptor to be different from the device descriptor sent to the host device when the combination device is plugged into the host device last time.

Step 102: According to the device descriptor modification instruction, modify the device descriptor according to the device descriptor modification instruction, and perform device reconnection processing.

After receiving the device descriptor modification instruction, the combination device may modify its default device descriptor, so that the modified descriptor is different from its default device descriptor, that is, different from the device descriptor sent to the host device when it was plugged into the host device last time. Furthermore, to send the modified device descriptor to the host device, the combination device needs to perform device reconnection processing. The reconnection processing can be done by the combination device itself, or can be done by the host device through simulating the reconnection process of the combination device, where the reconnection process can be implemented using prior art and is not detailed herein.

It should be noted that, this embodiment does not limit the specific modes in which the combination device modifies the device descriptor. Those of ordinary skill in the art may understand that, in this embodiment, it is only necessary to make the modified device descriptor different from the device descriptor sent to the host device when the combination device was plugged into the host device last time.

Step 103: Send the modified device descriptor to the host device, so that the host device establishes a new network connection based on the modified device descriptor.

After modifying the device descriptor, since the combination device performs reporting about the device, it can send the modified device descriptor to the host device.

When the host device receives the modified device descriptor, it may consider the combination device as a new combination device and establish a new network connection for the combination device.

In this embodiment, when determining that the network connection has not been released since the last removal of the combination device, the host device may send a device descriptor modification instruction to the combination device, to instruct the combination device to report the modified device descriptor when the combination device is plugged in this time. Therefore the host device considers the combination device as a new combination device according to the modified device descriptor, and establishes a new network connection for the combination device, which enables the user to access the network using the RNDIS device in the combination device. In this embodiment, it is not necessary for a user to restart the host device, which makes it convenient for the user to operate.

Figure 2:
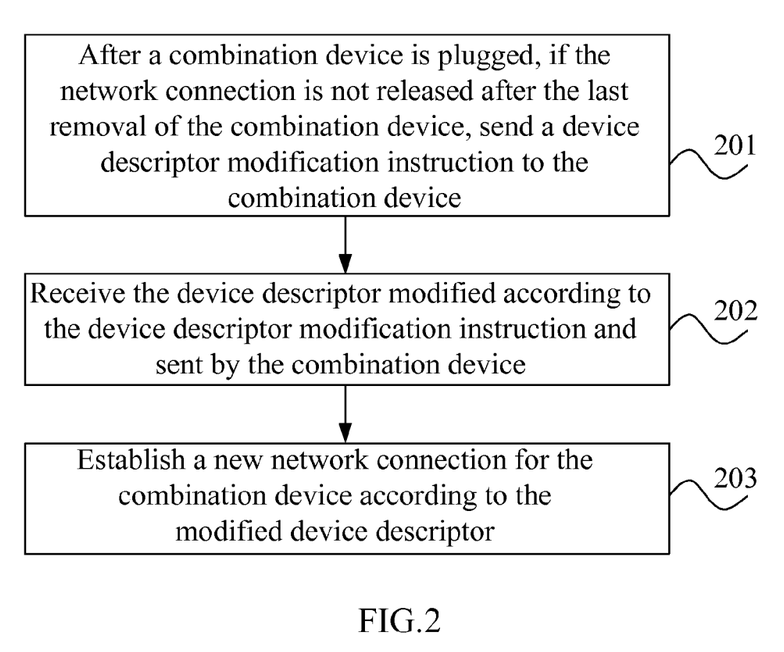
FIG. 2 is a flow chart of a second embodiment of a method for processing device connection according to the present invention.

FIG. 2 is a flow chart of a second embodiment of a method for processing device connection according to the present invention. As shown in FIG. 2, the embodiment is a process executed by the host device corresponding to the process executed by the combination device as shown in FIG. 1. The method of this embodiment may include the following.

Step 201: After the combination device is connected, if the network connection is not released after the combination device was removed last time, send a device descriptor modification instruction to the combination device.

After the combination device is connected to the host device, the host device may determine whether the network connection is released after the last removal of the combination device. If the network connection is not released, the host device may send a device descriptor modification instruction to the combination device. The device descriptor modification instruction may be used to instruct the combination device to modify the default device descriptor to a device descriptor different from the device descriptor sent to the host device when the combination device was plugged into the host device last time.

Step 202: Receive the device descriptor modified according to the device descriptor modification instruction and sent by the combination device.

After receiving the device descriptor modification instruction, the combination device may modify its default device descriptor, so that the modified descriptor is different from the default device descriptor, that is, different from the device descriptor sent to the host device when the combination device was plugged into the host device last time. In addition, to send the modified device descriptor to the host device, the combination device still needs to perform a device reconnection processing. The reconnection processing may be performed by the combination device itself, or may be performed by the host device by simulating the reconnection process of the combination device, where the reconnection process may be implemented in the prior art and is not detailed herein. It should be noted that, this embodiment does not limit the modes in which the combination device modifies the device descriptor. Those of ordinary skill in the art can understand that, in this embodiment, it is only necessary to make the modified device descriptor different from the device descriptor sent to the host device when the combination device was plugged into the host device last time.

After modifying the device descriptor, since it performs reporting about the device, the combination device may send the modified device descriptor to the host device.

Step 203: Establish a new network connection for the combination device, according to the modified device descriptor.

After receiving the modified device descriptor, the host device may determine, according to the modified device descriptor, that the combination device is a new combination device, and may establish a new network connection for the combination device.

In this embodiment, when determining that the network connection is not released after the last removal of the combination device, the host device may send a device descriptor modification instruction to the combination device, and instruct the combination device to report the modified device descriptor when the combination device is plugged in this time, so that the host device can consider the combination device as a new combination device according to the modified device descriptor and establish a new network connection for it, which enables the user can access the network using the RNDIS device in the combination device. In the embodiment, there is no need for the user to restart the host device, which makes it convenient for the user to operate.

In the following, a specific embodiment will be used to describe in detail the technical solution of the present invention.

Figure 3:
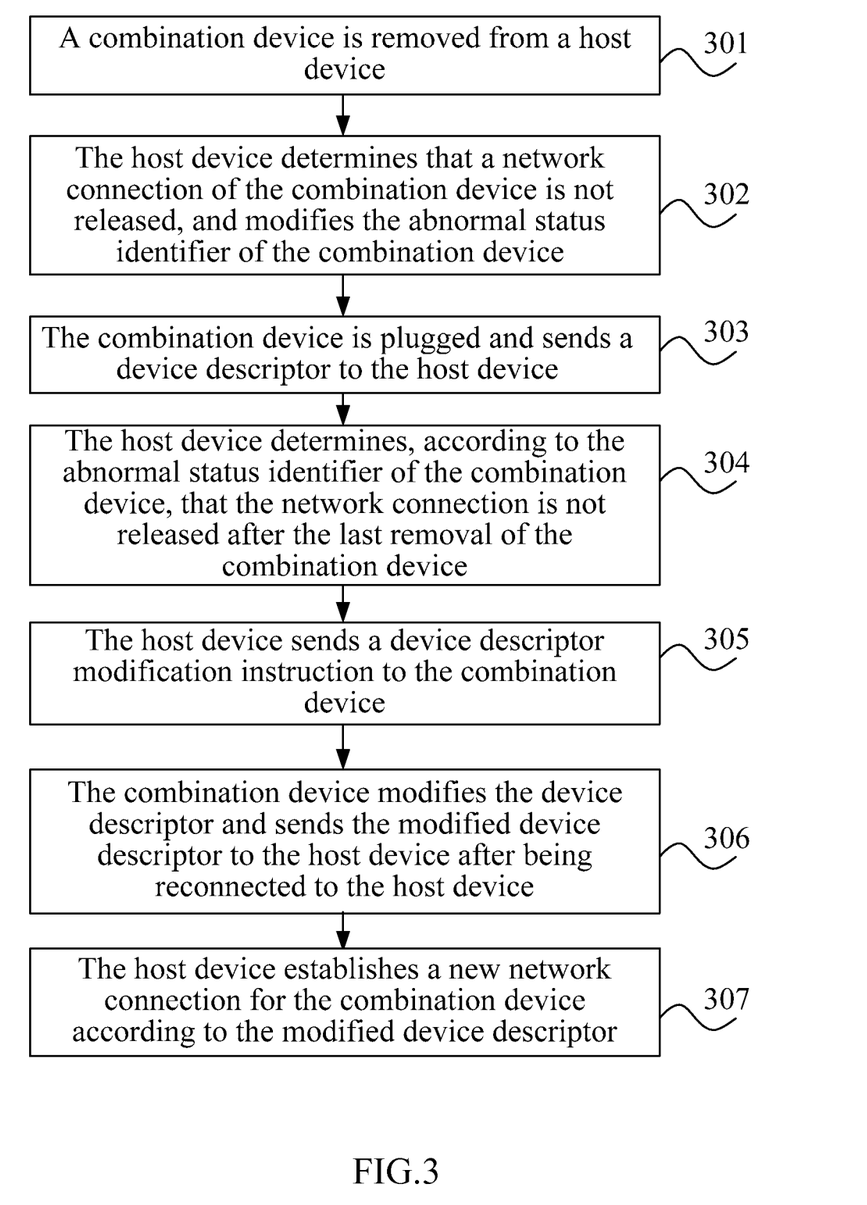
FIG. 3 is a flow chart of a third embodiment of a method for processing device connection according to the present invention.

FIG. 3 is a flow chart of the third embodiment of a method for processing device connection according to the present invention. As shown in FIG. 3, the method of this embodiment may include:

Step 301: Remove the combination device from the host device.

In this embodiment, it can be assumed that the combination device is formed by combining a RNDIS device with a SD card. When the combination device is removed from the host device, the SD card is being accessed. Therefore, the network connection to which the RNDIS device corresponds is not released.

Step 302: The host device determines that the network connection of the combination device is not released, and modifies the abnormal status identifier of the combination device.

Specifically, when accessing the network through the RNDIS device, the combination device generates a device node on a device tree, and creates a corresponding function of a network adapter in its memory. When determining whether the network connection is released when the combination device is removed, the host device may judge whether identification information of the combination device exists in the list of network adapters and whether the identification information of the combination device exists on the device tree. If the identification information of the combination device exists in the list of the network adapters and does not exist on the device tree, the abnormal status identifier is modified to be the identification information indicating that the network connection has not been released since the removal of the combination device.

In specific implementations, the host device may determine whether identification information of a network connection corresponding to the combination device exists in the network connections, through an API function GetAdaptersInfo in Iphelper. If such identification information does exist, a registration item corresponding to the identification information of the network connection can be looked up in the registry. The registration item includes an instance ID of an actual device node, where through the instance ID, it can be judged whether the host device is a current RNDIS device. If the device is a current RNDIS device, an API is further invoked to see whether the status of the RNDIS device is connected or unconnected. In this way, it can be determined whether the device is removed, and, if the device is removed, whether the network connection is released.

Step 303: The combination device is plugged into the host device and send to the host device a device descriptor.

When the combination device is plugged into the host device again, the device descriptor sent by the combination device to the host device is still the device descriptor reported by the combination device to the host device when the combination device was plugged into the host device last time.

Step 304: The host device determines, according to the abnormal status identifier of the combination device, that the network connection is not released after the last removal of the combination device.

At this time, the host device may determine, according to the abnormal status identifier of the combination device, that the network connection of the combination device is not released after the removal of the combination device in step 301.

At this time, the host device can not establish a network connection for the combination device. Therefore, the RNDIS device in the combination device can not access the network.

Step 305: The host device sends a device descriptor modification instruction to the combination device.

At this time, since the RNDIS device does not establish a network connection, the host device can not send the device descriptor modification instruction to the RNDIS device, but can send the instruction to other devices in the combination device. If the combination device includes only the RNDIS device and the SD card, the host device can only send the device descriptor modification instruction to the SD card. If the combination device includes other devices, such as a Human Interface Device (HID), the host device may send the device descriptor modification instruction to the combination device through a port of the HID device.

The embodiment is illustrated by using an example, in which the host device sends a device descriptor modification instruction to a port of the SD card. However, the embodiment is not restricted to sending the device descriptor modification instruction to a port of the SD card. As the SD card uses a Small Computer System Interface (SCSI) command to communicate with the host device, the host device may use an SCSI command as the device descriptor modification instruction to notify the combination device to modify the device descriptor. The operation code or the parameter of the SCSI command needs to be uniquely identified by the combination device. That is, the host device will not send same SCSI commands to the SD card of the combination device. For example, in the embodiment, the SCSI command may be 0x11. Of course, the SCSI command may be any other command that can be differentiated from the commands sent by the host device.

To ensure that after multiple successive times of plugging and removing the combination device, the host device can still enable the combination device to access the network through the RNDIS device, in this embodiment, operation codes respectively representing multiple descriptor modification modes may be introduced. These operations codes may represent a modification mode of changing the vendor ID (VID for short) of the device, a modification mode of changing the product ID (PID for short), or a modification mode of changing the version ID of the device, or any combination of these modes. These descriptor modification modes may be maintained either by the combination device or by the host device. If the combination device performs the maintenance, the device descriptor modification instruction sent by the host device may include an index of the present modification, where the combination device may know the modification mode of the device descriptor according to the index. If the host device performs the maintenance, the device descriptor modification instruction sent by the host device may include a specific operation code of the present modification. In addition, the host device needs to record which index of the modification mode or which operation code has been used, so that the host device may instruct the combination device to modify the device descriptor to be different from the device descriptor used last time.

Step 306: The combination device modifies the device descriptor, and sends the modified device descriptor to the host device after being reconnected to the host device.

If the device descriptor modification instruction sent by the host device includes index information about the descriptor modification mode, the combination device may determine how to modify the device descriptor by looking up in a comparison table of index information and modification modes which are maintained by the combination device. For example, if the index information included in the device descriptor modification instruction is 01, then the combination device knows, according to the 01, that the PID of the device descriptor needs to be modified. Therefore, the combination device may modify the PID of the device descriptor reported in step 303, so that the modified device descriptor is different from the device descriptor reported in step 303.

If the device descriptor modification instruction sent by the host device includes an operation code of the modification mode of the device descriptor, then the combination device may directly modify the device descriptor according to the operation code. For example, if the operation code included in the device descriptor modification instruction is 11 and the modification mode of the device descriptor represented by the operation code is modifying the device version ID in the device descriptor, the combination device may modify the device version ID in the device descriptor reported in step 303, so that the modified device descriptor is different from the device descriptor reported instep 303.

It should be noted that, the host device and the combination device may agree in advance whether the index mode or the operation code mode will be used to instruct the combination device. In addition, in this embodiment, it is not restricted that the host device only instructs the combination device to perform the foregoing descriptor modification modes. Those of ordinary skill in the art may design any modification mode of the device descriptor as needed, to make the presently reported device descriptor different from the device descriptor reported in step 303.

The combination device still needs to go through a device reconnection processing. The reconnection processing can either be performed by the combination device itself, or by the host device through simulating the reconnection process of the combination device. The reconnection process can be implemented in the prior art and is not detailed herein.

Once the combination device completes the reconnection processing, it can report the modified device descriptor to the host device.

Step 307, the host device establishes a new network connection for the combination device according to the modified device descriptor.

After the host device receiving the modified device descriptor, it can consider the combination device as a new combination device according to the modified device descriptor and establish a new network connection for the combination device.

In this embodiment, when determining that the network connection is not released after the last removal of the combination device, the host device may send a device descriptor modification instruction to the combination device. The device descriptor modification instruction can use either an index mode of the modification mode of the device descriptor or operation code mode of the modification mode of the device descriptor to instruct the combination device to report the modified device descriptor when the combination device is plugged in this time, such as a device descriptor with the VID, PID or version ID of the device being modified, so that the host device may consider the combination device as a new combination device according to the modified device descriptor and establish a new network connection for the combination device. This enables the user to access the network using the RNDIS device in the combination device. In this embodiment, it is not necessary for the user to restart the host device, which makes it convenient for the user to operate.

Figure 4:
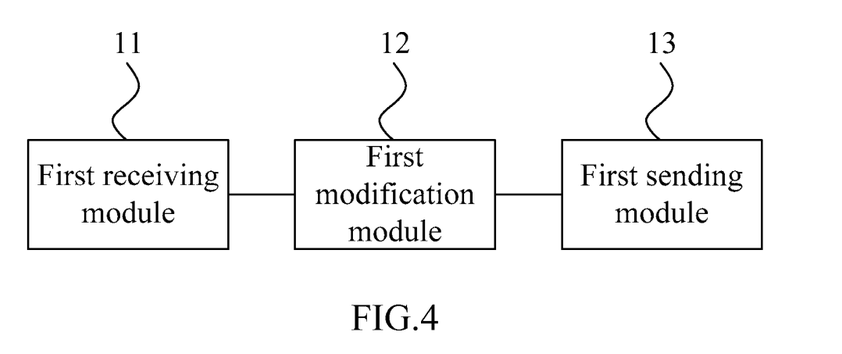
FIG. 4 is a schematic structural diagram of a first embodiment of a combination device according to the present invention.

FIG. 4 is a structural diagram of a first embodiment of a combination device according to the present invention. As shown in FIG. 4, the combination device of this embodiment may include: a first receiving module 11, a first modification module 12 and a first sending module 13. The first receiving module 11 is configured to receive a device descriptor modification instruction sent by a host device after the combination device is plugged into the host device. The first modification module 12 is configured to modify the device descriptor and perform device reconnection processing according to the device descriptor modification instruction. The first sending module 13 is configured to send the modified device descriptor to the host device, so that the host device establishes a new network connection according to the modified device descriptor.

The combination device can be formed by combining a RNDIS device with a SD card, or can be formed by combining a RNDIS device with other devices. The functions of the first receiving module 11 and the first sending module 13 can be implemented by using a transceiver unit of the combination device, and the first modification module 12 can be implemented by using a processing unit of the combination device.

The combination device in this embodiment is configured to perform the method of the method embodiment as shown in FIG. 1. The implementation principles and implementation effects of these embodiments are similar and are not detailed herein.

Figure 5:
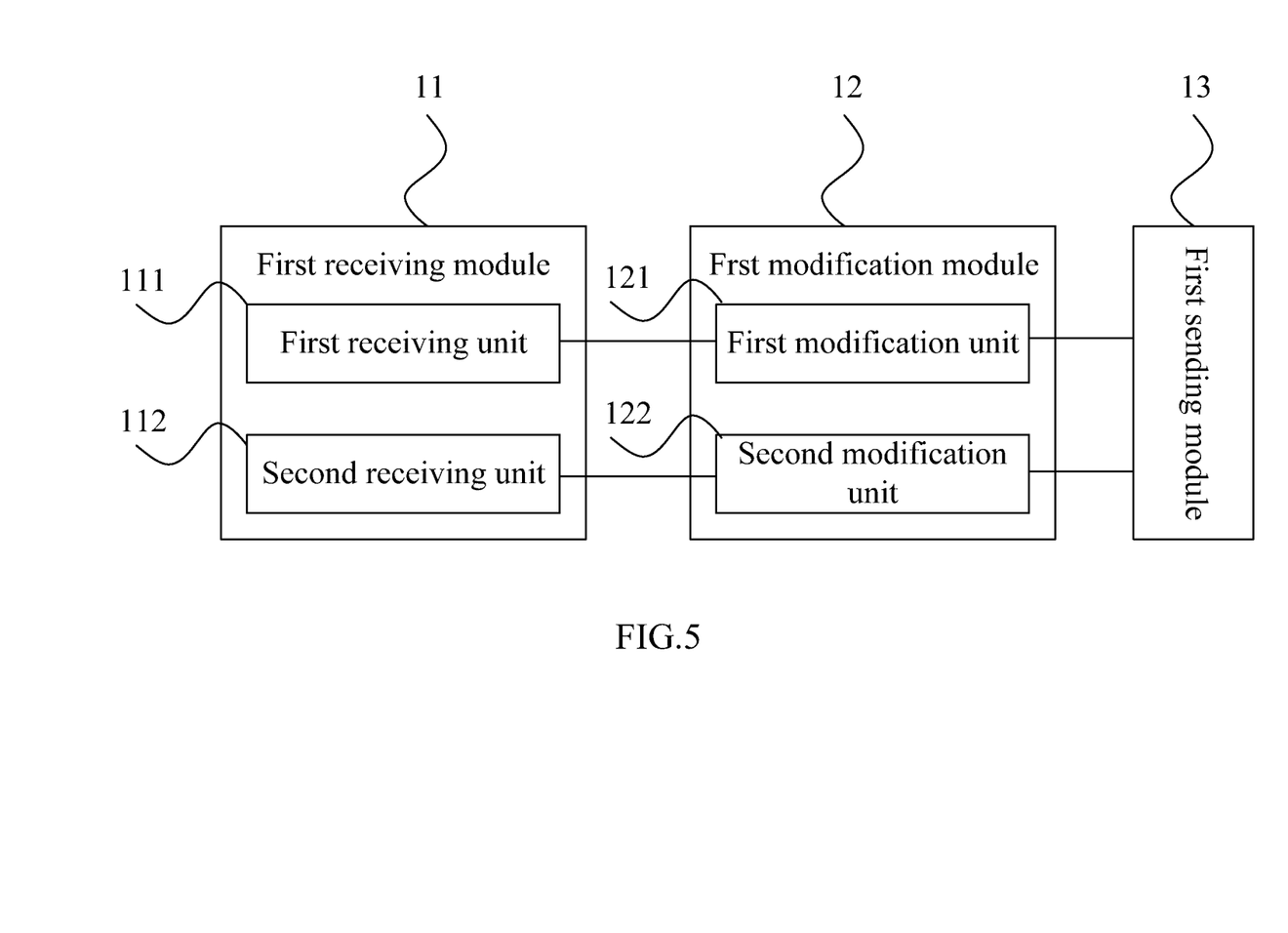
FIG. 5 is a schematic structural diagram of a second embodiment of a combination device according to the present invention.

FIG. 5 is a schematic structural diagram of a second embodiment of a combination device according to the present invention. As shown in FIG. 5, in the combination device according to this embodiment based on the device structure shown in FIG. 4, the first receiving module 11 includes a first receiving unit 111 and a second receiving unit 112, and the first modification module 12 includes a first modification unit 121 and a second modification unit 122. The first receiving unit 111 is configured to receive the device descriptor modification instruction sent by the host device, where the device descriptor modification instruction includes index information of a modification mode of the device descriptor. The second receiving unit 112 is configured to receive the device descriptor modification instruction sent by the host device, where the device descriptor modification instruction includes an operation code of the descriptor modification mode. A first modification unit 121 is configured to modify the device descriptor according to the operation code corresponding to the index information. A second modification unit 122 is configured to modify the device descriptor according to the operation code in the device descriptor modification instruction.

It should be noted that, in an optional embodiment, the first receiving module 11 may include only the first receiving unit 111, and the first modification module may include only the first modification unit 121. In another optional embodiment, the first receiving module 11 may include only the second receiving unit 112, and the first modification module 12 may include only the second modification unit 122.

The combination device in this embodiment is configured to perform the method in the method embodiment as shown in FIG. 3. The implementation principles and implementation effects of these embodiments are similar and not detailed herein.

Figure 6:
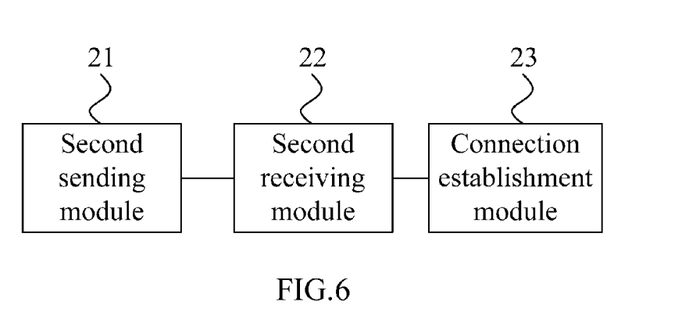
FIG. 6 is a schematic structural diagram of a first embodiment of a host device according to the present invention.

FIG. 6 is a structural diagram of the first embodiment of a host device according to the present invention. As shown in FIG. 6, the host device of this embodiment may include a second sending module 21, a second receiving module 22, and a connection establishment module 23, where the second sending module 21 is configured to send a device descriptor modification instruction to the combination device after the combination device is connected, if the network connection is not released after the last removal of the combination device. The second receiving module 22 is configured to receive the device descriptor modified according to the device descriptor modification instruction and sent by the combination device. The connection establishment module 23 is configured to establish a new network connection for the combination device according to the modified device descriptor.

The host device of this embodiment can be any host device can be plugged with a combination device, such as a PC or a netbook, etc. In the host device of this embodiment, both the second sending module 21 and the second receiving module 22 can be implemented by using a transceiver module of the current host device, and the connection establishment module can be implemented by using a network connection module of current host device.

The host device of this embodiment is configured to perform the method of the method embodiment shown in FIG. 3. The implementation principles and implementation effects of these embodiments are similar and are not detailed herein.

Figure 7:
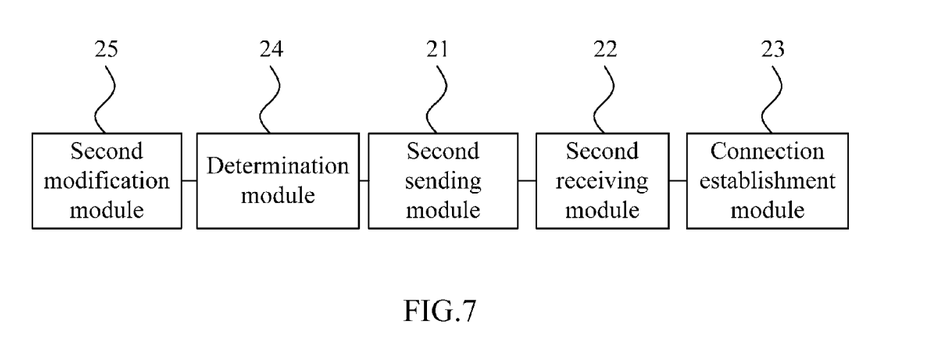
FIG. 7 is a schematic structural diagram of a second embodiment of a host device according to the present invention.

FIG. 7 is a schematic structural diagram of a second embodiment of a host device according to the present invention. As shown in FIG. 7, according to the host device shown in FIG. 6, the host device in this embodiment further includes a determination module 24 and a second modification module 25. The determination module 24 is configured to determine, according to an abnormal status identifier of the combination device, whether the network connection is released after the last removal of the combination device, before the second sending module 21 sending the device descriptor modification instruction to the combination device; and is configured to determine whether identification information of the combination device exists in the list of network adapters and whether identification information of the combination device exists on the device tree, after the last removal and before the present connection. The second modification module 25 is configured to modify the abnormal status identifier to be the identification information indicating that the network connection is not removed after the last removal of the combination device, if the identification information of the combination device exists in the list of network adapters and the identification information of the combination device does not exist on the device tree.

The host device of this embodiment is configured to perform the method of the method embodiment shown in FIG. 3. The implementation principles and implementation effects of these embodiments are similar and are not detailed herein.

Those of ordinary skill in the art can understand that, the implementation of all or part of the steps of the foregoing method embodiments can be achieved by a program instructing hardware. The foregoing program may be stored in a computer readable storage medium. When executed, the program will perform the steps of the foregoing method embodiments. The aforesaid storage medium includes any medium capable of storing program codes, such as an ROM, an RAM, a magnetic disk, or an optical disk.

Finally, it should be noted that, the foregoing embodiments are merely used for illustrating, but not for limiting, the technical solutions of the present invention. Though the present invention has been described in detail with reference to the aforesaid embodiments, those of ordinary skill in the art should understand that, modifying the technical solutions recorded in the foregoing embodiments or replacing some of the technical features with equivalents are still possible, and these modifications or replacements will not cause corresponding technical solutions to depart from the spirit and scope of the technical solutions of the embodiments of the present invention.

What is claimed is:

1. A processing method for a combination device connected to a host device, wherein a first network connection, established by the host device for the combination device based on a first device descriptor sent to the host device from the combination device, was not released after a last removal of the combination device from the host device, the method comprising:

after being plugged into the host device again, receiving, by the combination device, a device descriptor modification instruction sent by the host device;

modifying a default device descriptor according to the device descriptor modification instruction to produce a modified device descriptor different than the first device descriptor and performing device reconnection processing;

sending the modified device descriptor to the host device, to enable the host device to establish a new network connection for the combination device responsive to the modified device descriptor; and accessing a network using the new network connection established by the host device.

2. The method of claim 1, wherein the device descriptor modification instruction comprises index information of a modification mode of the device descriptor; and the modifying the device descriptor according to the device descriptor modification instruction further comprises:

modifying the device descriptor according to an operation code corresponding to the index information.

3. The method of claim 1, wherein the device descriptor modification instruction comprises an operation code of a modification mode of the device descriptor; and the modifying the device descriptor according to the device descriptor modification instruction comprises:

modifying the device descriptor according to the operation code in the device descriptor modification instruction.

4. The method of claim 3, wherein the modification mode of the device descriptor comprises at least one mode of modifying a product ID, modifying a vendor ID and modifying a device version ID.

5. The method of claim 1, wherein the sending the modified device descriptor to the host device specifically comprises:

sending the modified device descriptor to the host device through a port of a device other than a Remote Network Driver Interface Specification (RNDIS) device.

6. A processing method for a combination device connected to a host device, wherein a first network connection, established by the host device for the combination device based on a first device descriptor sent to the host device from the combination device, was not released after a last removal of the combination device from the host device, the method comprising:

after the combination device is plugged in again, sending, by the host device, a device descriptor modification instruction to the combination device;

receiving a modified device descriptor different than the first device descriptor and modified according to the device descriptor modification instruction and sent by the combination device; and establishing a new network connection for the combination device, responsive to the modified device descriptor.

7. The method of claim 6, wherein the sending the device descriptor modification instruction to the combination device comprises:

sending the device descriptor modification instruction to a port of a device other than a Remote Network Driver Interface Specification (RNDIS) device in the combination device.

8. The method of claim 6, wherein the sending the device descriptor modification instruction to the combination device comprises:

sending the device descriptor modification instruction to the combination device, wherein the device descriptor modification instruction comprises an operation code or index information of modification modes of the device descriptor.

9. The method of claim 8, wherein a modification mode of the device descriptor comprises at least one mode of modifying the product ID, modifying the vendor ID and modifying the device version ID.

10. The method of claim 9, wherein after the combination device is plugged in, and before sending the device descriptor modification instruction to the combination device, the method further comprises:

determining, according to an abnormal status identifier of the combination device, whether the network connection is released after the last removal of the combination device.

11. The method of claim 10, wherein after the last removal and before the present plugging in of the combination device, the method further comprises:

determining whether identification information of the combination device exists in a list of network adapters and whether the identification information of the combination device exists on a device tree; and if the identification information of the combination device exists in the list of network adapters but does not exists on the device tree, modifying the abnormal status identifier to be identification information indicating that the network connection is not released after the last removal of the combination device.

12. A combination device, comprising:

a transceiver unit, configured to receive a device descriptor modification instruction sent by a host device after the combination device is plugged into the host device again after a last removal of the combination device from the host device, wherein a first network connection, established by the host device for the combination device based on a first device descriptor sent to the host device from the combination device, was not released;

a processing unit, configured to modify a default device descriptor responsive to the device descriptor modification instruction to produce a modified device descriptor different than the first device descriptor and perform a device reconnection processing; and wherein the transceiver unit is further configured to send the modified device descriptor to the host device, to enable the host device to establish a new network connection responsive to the modified device descriptor, and to access a network using the new network connection established by the host device.

13. The combination device of claim 12, wherein the transceiver unit comprises:

a first receiving unit, configured to receive the device descriptor modification instruction sent by the host device, wherein the device descriptor modification instruction comprises index information of a modification mode of the device descriptor; and the processing unit comprises:

a first modification unit, configured to modify the device descriptor according to an operation code corresponding to the index information.

14. The combination device of claim 12, wherein the transceiver unit comprises:

a second receiving unit, configured to receive the device descriptor modification instruction sent by the host device, the device descriptor modification instruction comprising an operation code of modes of modifying the device descriptor; and the processing unit comprises:

a second modification unit, configured to modify the device descriptor according to the operation code in the device descriptor modification instruction.

15. A host device, comprising:
a transceiver configured to send a device descriptor modification instruction to a combination device after the combination device is plugged in, if a network connection, established by the host device for the combination device based on a first device descriptor sent to the host device from the combination device, was not released after a last removal of the combination device from the host device;
the transceiver also configured to receive a modified device descriptor different than the first device descriptor and modified according to the device descriptor modification instruction and sent by the combination device; and
a connection establishment module, configured to establish a new network connection for the combination device responsive to the modified device descriptor.

16. The host device of claim 15, further comprising:
a determination module, configured to determine, according to an abnormal status identifier of the combination device, whether the network connection is released after the last removal of the combination device, before the second sending module sends the device descriptor modification instruction to the combination device, and configured to determine whether identification information of the combination device exists in a list of network adapters and whether the identification information of the combination device exists on a device tree, after the last removal and before the present connection of the combination device; and
a second modification module, configured to modify the abnormal status identifier to be identification information indicating that the network connection is not released after the last removal of the combination device, if the identification information of the combination device exists in the list of network adapters but does not exist on the device tree.

* * * * *